United States Patent
Hoehl et al.

(10) Patent No.: US 10,502,552 B2
(45) Date of Patent: Dec. 10, 2019

(54) FIELD SPLITTER FOR THREE-DIMENSIONAL STRAIN MEASUREMENT

(71) Applicant: ILLINOIS TOOL WORKS INC., Glenview, IL (US)

(72) Inventors: Christian J. Hoehl, Over-Rambstadt (DE); Martin A. Peterson, Wrentham, MA (US); Roy D. Allen, North Andover, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/745,811

(22) PCT Filed: Jul. 25, 2016

(86) PCT No.: PCT/US2016/043884
§ 371 (c)(1),
(2) Date: Jan. 18, 2018

(87) PCT Pub. No.: WO2017/034723
PCT Pub. Date: Mar. 2, 2017

(65) Prior Publication Data
US 2018/0216929 A1    Aug. 2, 2018

Related U.S. Application Data

(60) Provisional application No. 62/210,513, filed on Aug. 27, 2015.

(51) Int. Cl.
*G01B 11/16* (2006.01)
*G02B 27/10* (2006.01)
*G06T 7/00* (2017.01)

(52) U.S. Cl.
CPC .............. *G01B 11/16* (2013.01); *G02B 27/10* (2013.01); *G06T 7/0004* (2013.01); *G06T 7/97* (2017.01)

(58) Field of Classification Search
CPC ....... G01B 11/16; G01B 11/165; G01B 11/24; G01B 11/162; G01B 11/00;
(Continued)

(56) References Cited

U.S. PATENT DOCUMENTS 5,175,616 A * 12/1992 Milgram ................ G03B 35/08
348/47
5,757,473 A   5/1998 Kanduth et al.
(Continued)

OTHER PUBLICATIONS

International Search Report issue in PCT/US2016/043884 dated Nov. 24, 2016.
(Continued)

*Primary Examiner* — Michael P Stafira
(74) *Attorney, Agent, or Firm* — McCarter & English, LLP

(57) ABSTRACT

The present disclosure provides an apparatus and method which uses a field splitter or a beam splitter for the purpose combining two different views of a materials testing sample under materials testing into a single image. This allows for three-dimensional strain measurement in the context of material/compound testing. In particular, the time and stress dependent change in gauge length can be tracked and calculated in order to calculate the time and stress dependent strain. The method and apparatus allows imaging on a single image sensor for the three-dimensional strain calculation.

12 Claims, 7 Drawing Sheets

(58) Field of Classification Search
CPC . G01B 11/0608; G01B 11/002; G01B 11/161; G01B 2210/52; G01B 2210/58; G01B 7/18; G01B 9/0203; G01B 9/02087; G01B 9/02098; G01N 2203/0647; G01N 3/068; G01N 3/08; G01N 21/27; G01N 2291/02475; G01N 2291/02827; G01N 29/06; G01N 29/0609; G01N 29/265; G01N 29/50; G01N 11/10; G01N 11/14; G01N 2033/0078; G01N 21/45; G01N 21/8806; G01N 21/892; G01N 2203/0003; G01N 2203/0071; G01N 2203/0212; G01N 2203/0264; G01N 2203/0298; G01N 2203/0652; G01N 2203/0682; G01N 33/222; G01N 3/00; G01N 3/02; G01N 3/26; G01J 2003/2826

See application file for complete search history.

(56) References Cited

U.S. PATENT DOCUMENTS

| | | | | |
|---|---|---|---|---|
| 5,860,912 | A * | 1/1999 | Chiba | A61B 1/00059 600/111 |
| 10,054,777 | B2 * | 8/2018 | Wallace | G02B 21/0056 |
| 2012/0176629 | A1 | 7/2012 | Allen et al. | |
| 2012/0287248 | A1 * | 11/2012 | Erdman, III | G01N 3/068 348/47 |
| 2013/0107004 | A1 * | 5/2013 | Maeda | G01B 11/16 348/46 |
| 2013/0147919 | A1 | 6/2013 | Xia et al. | |
| 2013/0250278 | A1 * | 9/2013 | Zhao | G01B 11/162 356/35.5 |
| 2014/0037217 | A1 * | 2/2014 | Iliopoulos | G06K 9/6232 382/201 |
| 2014/0111810 | A1 * | 4/2014 | Shen | G01B 9/0203 356/511 |

OTHER PUBLICATIONS

K. Genovese et al: "Stereo-Digital Image Correlation (DIC) Measurements With a Single Camera Using a Biprism", Optics and Lasers in Engineering, vol. 51, No. 3, Mar. 1, 2013, pp. 278-285.

* cited by examiner

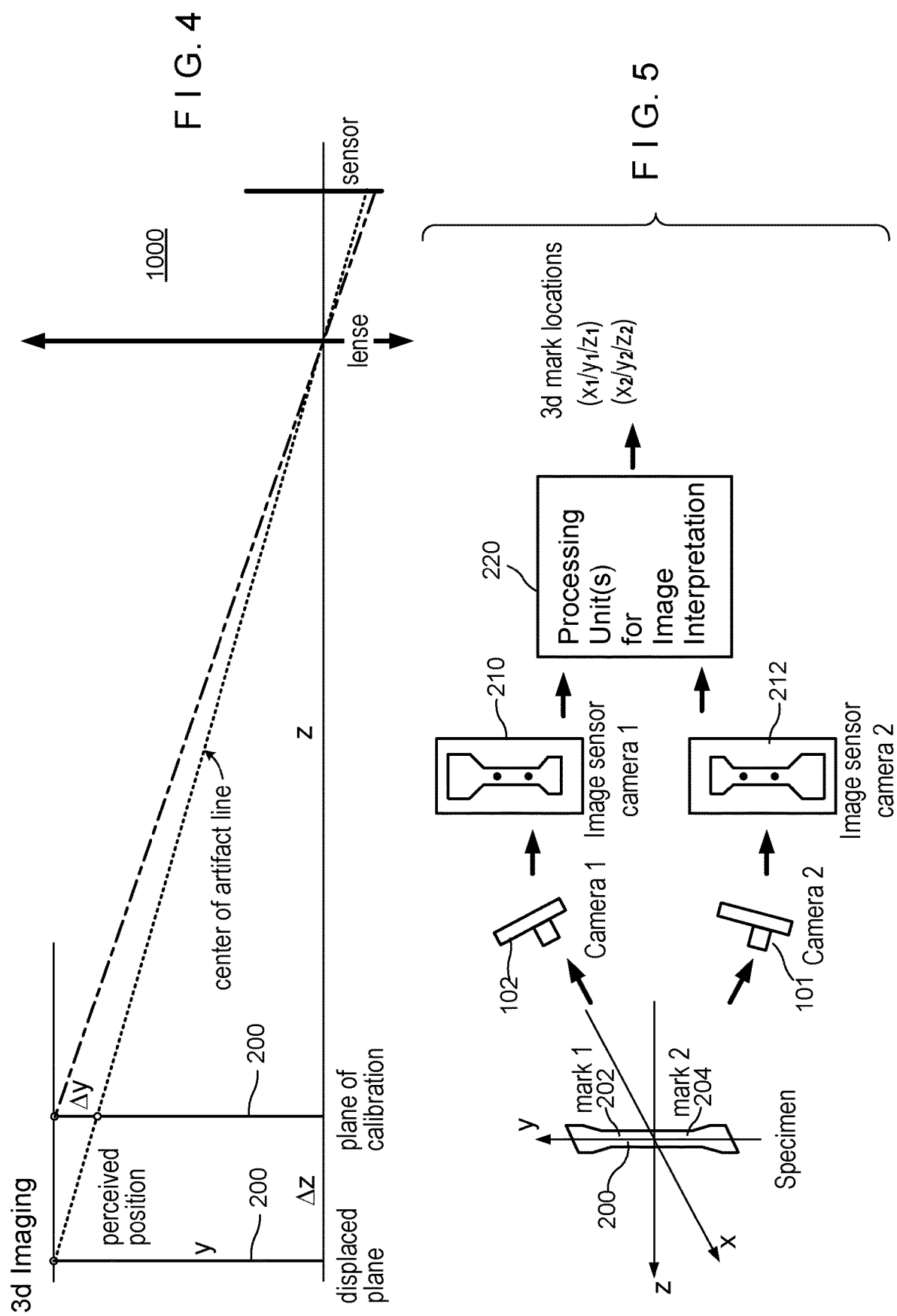

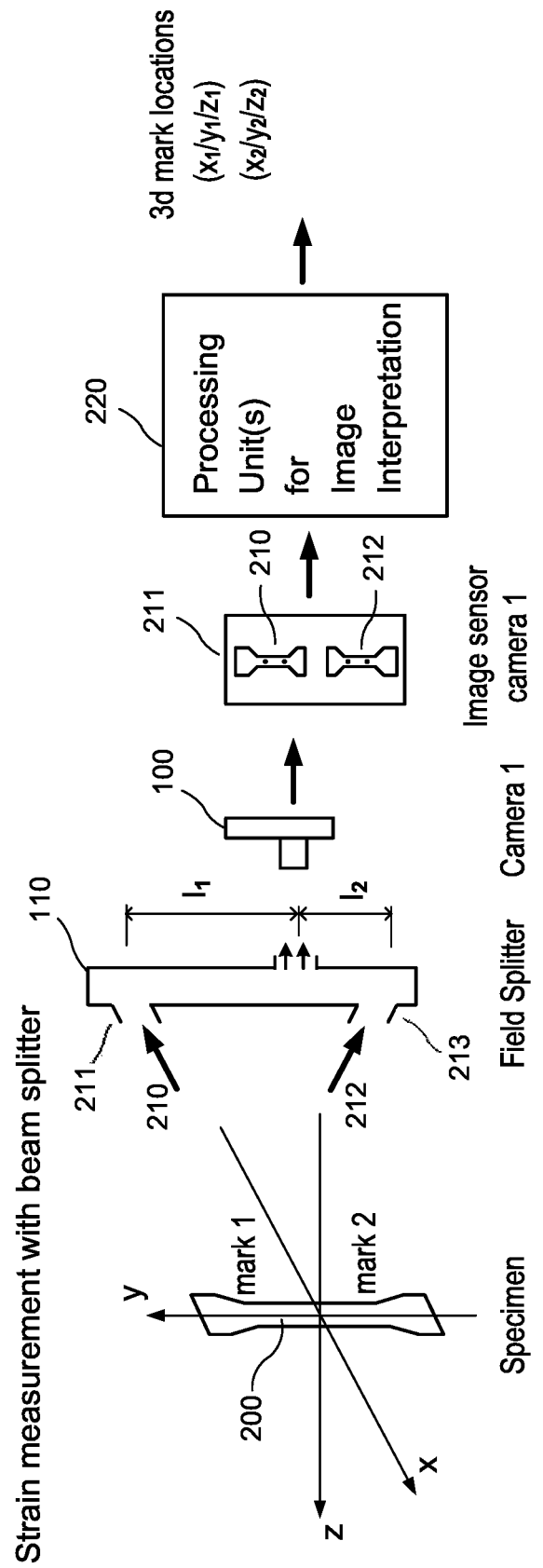
F I G. 7

FIELD SPLITTER FOR THREE-DIMENSIONAL STRAIN MEASUREMENT

This application is a National Phase application of PCT International Application PCT/US2016/043884, filed on Jul. 25, 2016, which claims priority under 35 U.S.C. 119(e) of U.S. provisional application Ser. No. 62/210,513, filed on Aug. 27, 2015, the contents of which is hereby incorporated by reference in its entirety and for all purposes.

BACKGROUND OF THE DISCLOSURE

Field of the Disclosure

The present disclosure pertains to a field splitter for a three-dimensional strain measurement which images two views of the same object under specified load on a single image sensor thereby providing data for a three-dimensional strain measurement.

Description of the Prior Art

In materials testing involving strain measurement, most techniques for three-dimensional strain measurement require images from different angles of an object. Current or prior art three-dimensional strain measurement devices typically utilize two cameras to image the object under different perspectives. Both cameras need to be synchronized in time and require a fixed geometrical alignment after calibration.

Further prior art includes "Stereo-Digital Image Correlation (DIC) Measurements with a Single Camera Using a Biprism" by Genovese et al., published in Optics and Lasers In Engineering, Volume 51, Issue 3, March 2013, pages 278-285 and "3D Digital Image Correlation Using a Single High-Speed Camera for Out-of-Plane Displacements at High Rates" by Pankow et al., in the Fifteenth International Conference on Experimental Mechanics, Paper Reference 2927.

SUMMARY OF THE DISCLOSURE

It is therefore an object of the present disclosure to provide an apparatus with improvements in the field of three-dimensional strain measurement.

It is therefore a further object of the present disclosure to provide an apparatus for three-dimensional strain measurement which uses a single camera or similar digital imaging device.

These and other objects are attained by the present disclosure which provides an apparatus and method which uses a field splitter or a beam splitter to receive two images, from different angles, of the testing sample under materials testing, and combine the images into a single image, received by a single camera or similar digital imaging device for the purpose of three-dimensional strain measurement in the context of material/compound testing. The method and apparatus allows imaging on a single image sensor with the benefit of avoiding or minimizing synchronization difficulties. Additionally, the camera electronics do not need to be duplicated thereby reducing the weight and increasing the mechanical stability of the imaging system.

BRIEF DESCRIPTION OF THE DRAWINGS

Further objects and advantages of the disclosure will become apparent from the following description and from the accompanying drawing, wherein:

FIG. 4 illustrates how moving a specimen away from the lens changes perceived dot position for two-dimensional strain measurement.

FIG. 5 illustrates a prior art arrangement for three-dimensional strain measurement using two image sensors.

FIG. 7 is a schematic of the use of a field splitter and a single image sensor calculating three-dimensional strain using an embodiment of the present disclosure.

DETAILED DESCRIPTION OF THE PREFERRED EMBODIMENT

Referring now to the figures in detail wherein like numerals refer to like elements throughout the several views, one sees that FIGS. 1-4 illustrate prior art two-dimensional strain measurement and FIG. 5 illustrates prior art three-dimensional strain measurement using dual cameras and image sensors. The apparatus of FIG. 5 may be disadvantageous in that both cameras have to be rigidly mounted against each other and have to be synchronized in time.

Figure 1:
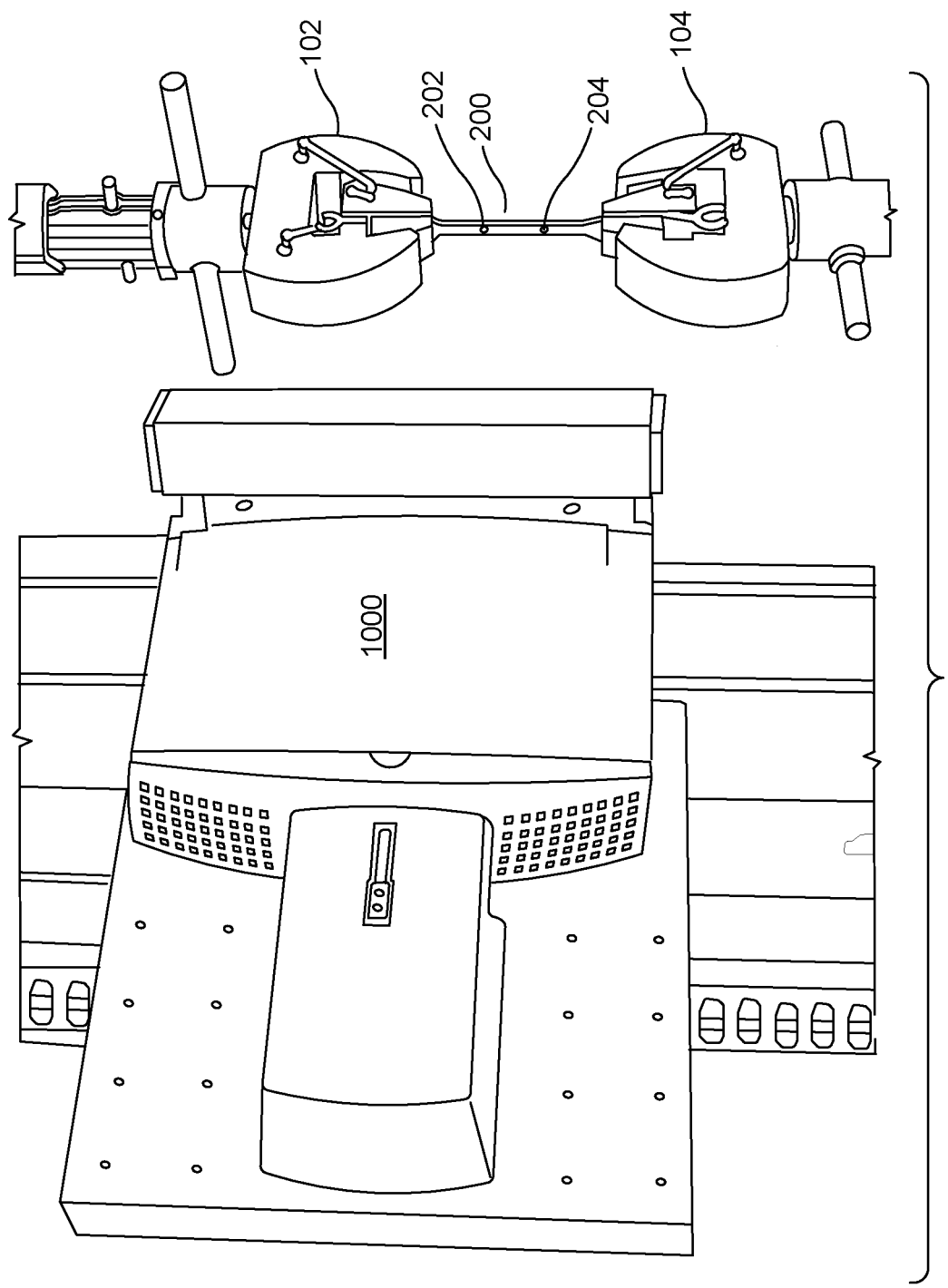
FIG. 1 is a schematic of a typical prior art setup to optically measure two-dimensional strain.
Figure 2A:
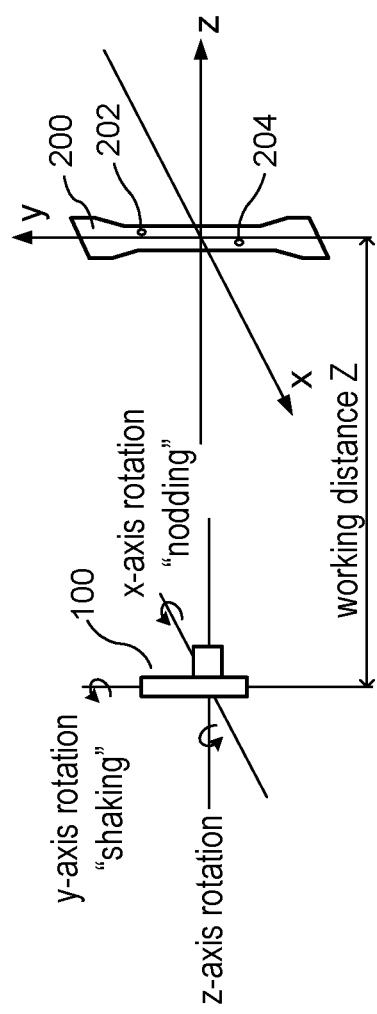
FIG. 2A is a schematic of the experimental prior art setup with respect to FIG. 1.
Figure 2B:
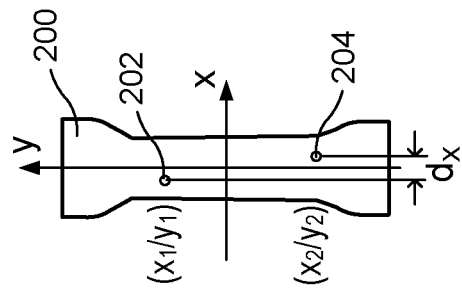
FIG. 2B is a schematic of a materials sample with x-axis misalignment of the two video targets, as may occur with the experimental prior art setup of FIG. 2A.
Figure 3:
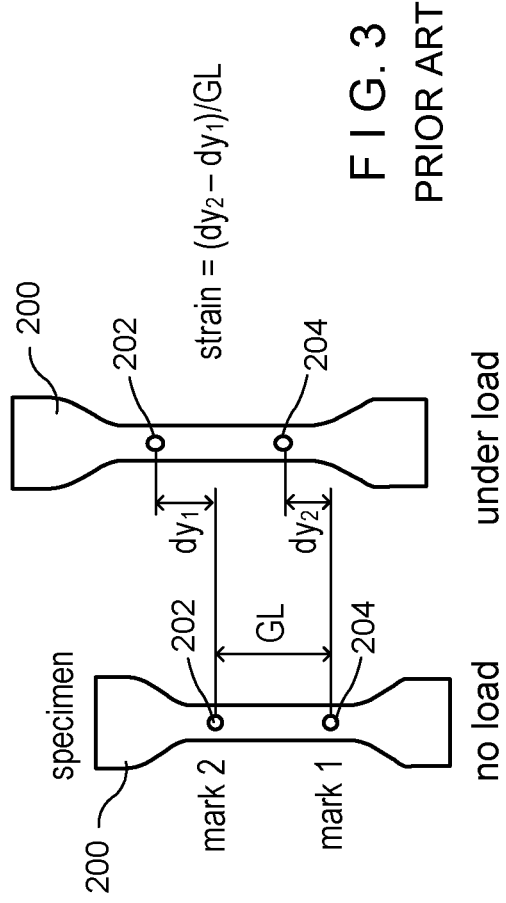
FIG. 3 is a schematic of the calculation of strain based on a view of the specimen, shown under no load (left-side) and under load (right-side) for two-dimensional strain.

In particular, FIG. 1 illustrates a prior art device wherein a video device or camera 1000 (typically using CCD or similar technology) captures an optical image of a materials sample 200 being placed under a stress-inducing load, such as tensile load, by grips 102, 104. As shown in the left side of FIG. 3, the materials sample 200 includes first and second video targets 202, 204, separated by a gauge length (GL). The position and relative movement of video targets 202, 204 is monitored, calculated and recorded by the video device 1000 during the materials test in order to calculate a strain versus stress curve. As shown in the right side of FIG. 3, the difference in translational movement between the first and second video targets can be used to calculate a change in the gauge length. This change in gauge length, divided by the original gauge length of the left side of FIG. 3 is used to calculate the strain. As shown in FIG. 2A, the configuration of FIG. 1 is susceptible to errors resulting from movement or inaccurate placement of video device or camera 1000, such as, but not limited to X-axis rotation or nodding, Y-axis rotation or shaking, or Z-axis rotation. The working distance Z between the video device or camera 1000 is positioned along the Z-axis. As shown in FIG. 2B, any such movement or inaccurate placement of the video device or camera 1000 or the materials sample 200 may result in inaccurate or non-aligned, such as along the X-axis, as illustrated.

Similarly, as shown in FIG. 4, a displacement of the sample 200 resulting in a displacement of the plane of calibration by Δx, thereby changing the perceived and calculated position of the video target 202 by the video device or camera 1000.

FIG. 5 likewise illustrates a prior art system wherein three-dimensional data is collected by first and second video devices or cameras 101, 102 capture an image data of the sample 200 (including video targets 202, 204) from two different angles thereby creating first and second data images 210, 212 to be analyzed by digital image processing unit 220 to calculate the three-dimensional data to perform the strain calculations. The native result of the image interpretation may be a third mark location which is used to calculate and output strain. From the two available data images 210, 212, available strain may be calculated in arbitrary coordinate system even if the specimen 200 moves during the test.

Figure 6:
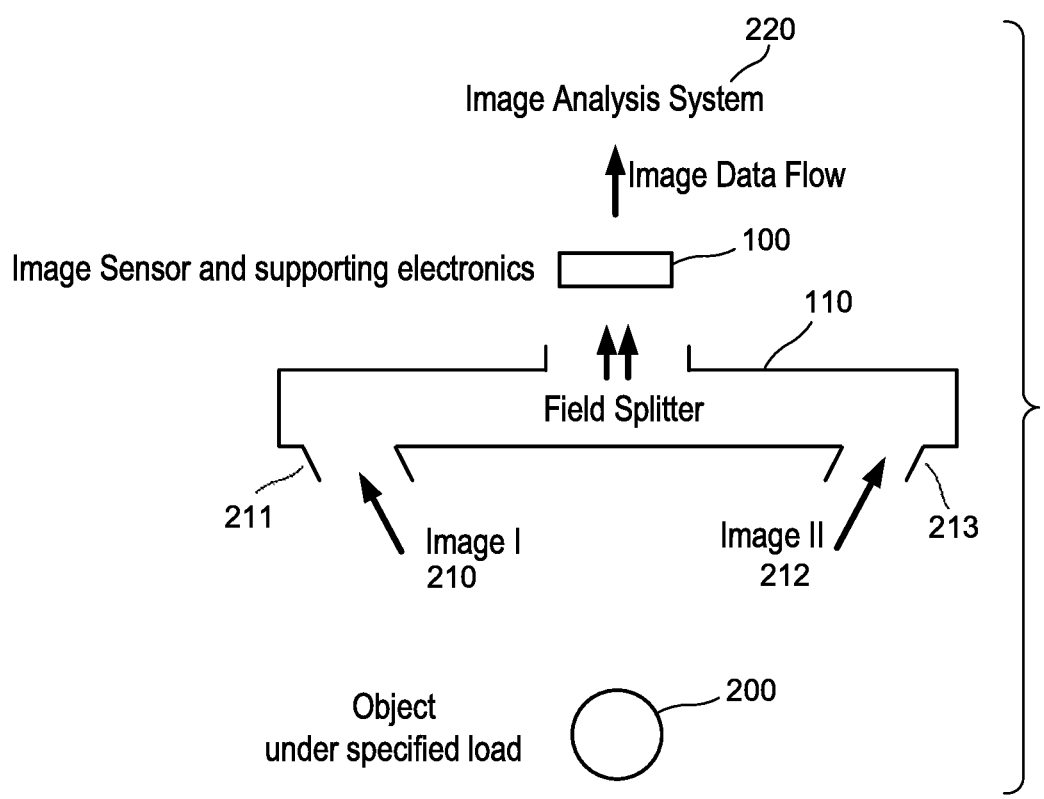
FIG. 6 is a schematic of the device of the present disclosure for three-dimensional strain measurement.

FIGS. 6 and 7 illustrate an embodiment of the present disclosure, using a field splitter (or beam splitter) 110 to distribute first and second images 210, 212 onto a single camera or similar digital device 100 (including an image sensor) thereby generating a single image 211 which includes the data from first and second images 210, 212, captured through respective first and second objectives 211, 213, for analysis with respect to three-dimensional strain. A prior art field splitter may be found in U.S. Pat. No. 3,218,908. A field splitter typically uses a viewing instrument, first and second objectives, and prisms or similar devices to receive two images through the objectives and combine the two images (typically side-by-side) into a final single image on the focal plane of the viewing instrument. The two images may be two different views of the same object. A field splitter further typically has the capability to adjust the position of the two images in the final single image. This may be done by adjusting the position and/or orientation of the prisms or similar devices.

Figure 8:
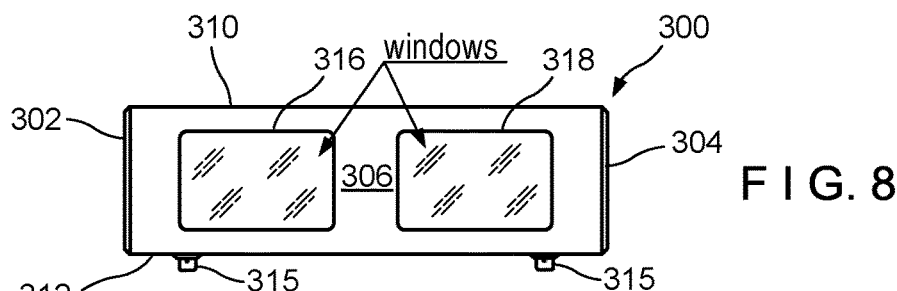
FIG. 8 is a front view of the digital imaging device of the present disclosure, viewing the two windows leading to the two inputs to the field splitter.
Figure 9:
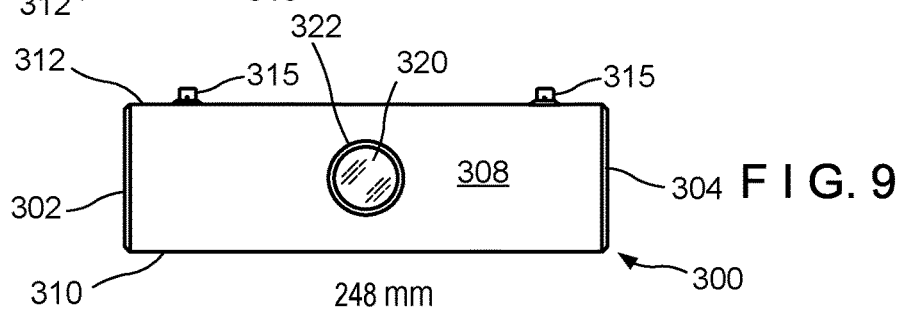
FIG. 9 is a rear view of the field splitter assembly of the present disclosure.

FIGS. 8-12 illustrate the field splitter assembly 300 (including a field splitter 110 therewithin) of an embodiment of the present disclosure. The disclosed embodiment of field splitter assembly 300 has a housing including substantial square end caps 302, 304 with rectangular front surface 306, rear surface 308, top surface 310 and bottom surface 312 thereby forming an enclosure with orthogonal sides. However, further embodiments may have different geometries of the field splitter assembly 300. Various surfaces may include optional mounting studs 314 for securing the position of the field splitter assembly 300. Similarly, caphead assemblies 315 (which may include washers or similar mechanical devices) may maintain the structural integrity of the field splitter assembly 300 and protrude through the various faces. As shown in FIG. 8, front surface 306 includes first and second windows (or optical pathways) 316, 318 for receiving first and second images 210, 212 (see FIG. 6), from different angles, of the materials sample 200, including video targets 202, 204 (typically of contrasting color to the materials testing sample 200, thereby allowing their location to be measured by optical methods), in order to provide these images to field splitter 110 (see FIG. 6) and subsequently to camera 100. Rear surface 308 includes a central circular output window 320. Central circular output window (or third optical pathway) 320 includes a device, such as, but not limited to, an externally threaded ring 322, around the periphery thereof for engaging the forward or proximal end of a digital photographic lens 400 (see FIGS. 10 and 11) so that the conventional lens mount 402 is presented for attachment to a digital camera or similar digital device including an image sensor (such as device 100 of FIGS. 6 and 7) for generating a single composite image 211 to digital image processing unit 220 in order to calculate the three-dimensional time-dependent and stress-dependent displacement of the video targets 202, 204 in order to calculate a change in the gauge length between the targets 202, 204, wherein the change in gauge length divided by the original gauge length (see FIG. 3) is used to calculate the time-dependent and stress-dependent strain on the materials sample 200 during the course of a materials testing session. A typical, but non-limiting, example of the digital photographic lens 400 and conventional lens mount 402 is a Fujinon HF9HA-1B lens with a C-mount. Different lenses, with different focal lengths, f-stops and mounts, may be appropriate or applicable for different embodiments.

Figure 10:
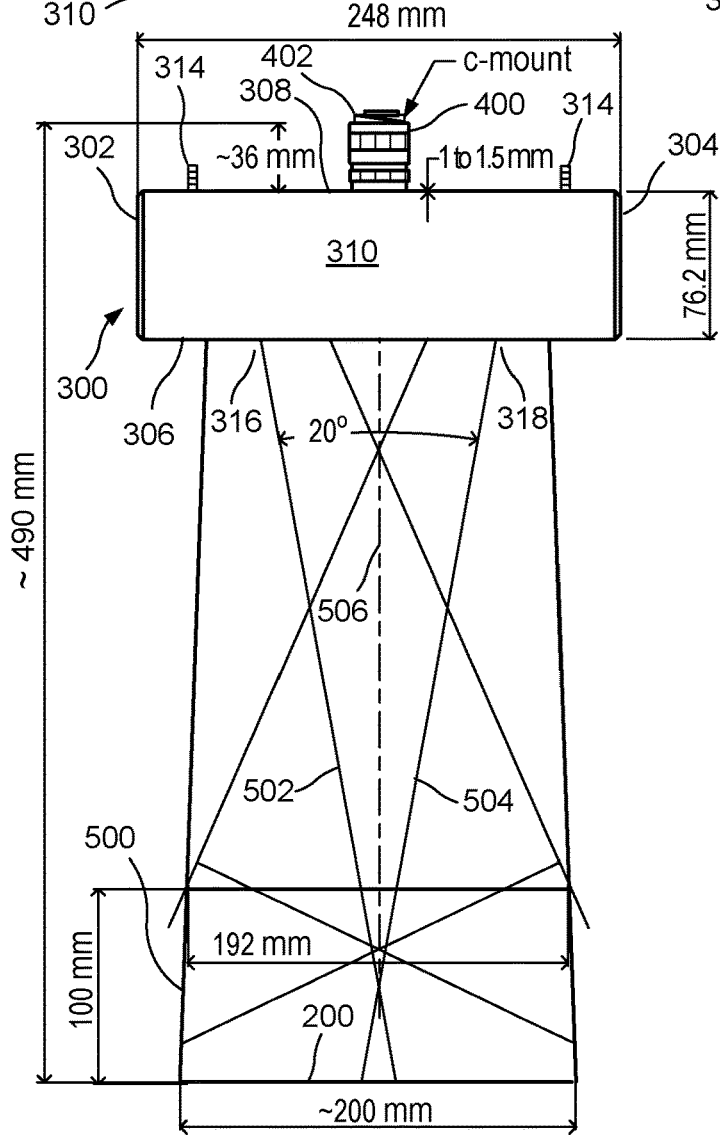
FIG. 10 is a side view of the field splitter assembly of the present disclosure, further illustrating a typical range of view for operation as a strain detector.
Figure 11:
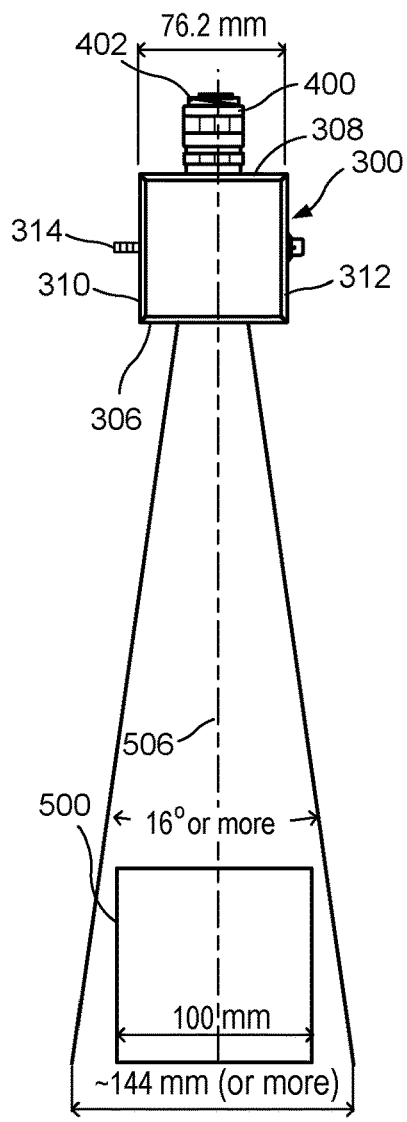
FIG. 11 is an end view of the field splitter assembly of the present disclosure, further illustrating a typical range of view for operation as a strain detector.

The dimensions, angles and relationships shown in FIGS. 10 and 11 are meant to illustrative. Different embodiments may implement different dimensions, angles and relationships. As shown in FIG. 10, the materials sample 200 may be placed approximately 490 mm from the plane of the lens mount 402 (440 mm to the center of optimal viewing area 500 plus 50 mm, one half of the depth of optimal viewing area 500). Optimal viewing area 500 is approximately 200 mm in length (parallel to the field splitter assembly 300) and 100 mm in depth (perpendicular to the field splitter assembly). The centerlines of view 502, 504 of first and second windows 316, 318 may be separated by 20 degrees, each being separated by 10 degrees from the centerline 506 so as to converge in the center of the optimal viewing area 500. Likewise, as shown in FIG. 11, the field of view of first and second windows 316, 318 may extend approximately 8 degrees on either side of centerline 506 (for a total range of 16 degrees) resulting in a width of approximately 100 mm In use, the field splitter assembly 300 may be mounted similarly to the digital device or camera 1000 of FIG. 1, thereby typically allowing the field splitter assembly 300 and associated apparatus to be used in combination with existing mounting apparatus and grips 102, 104.

Figure 12:
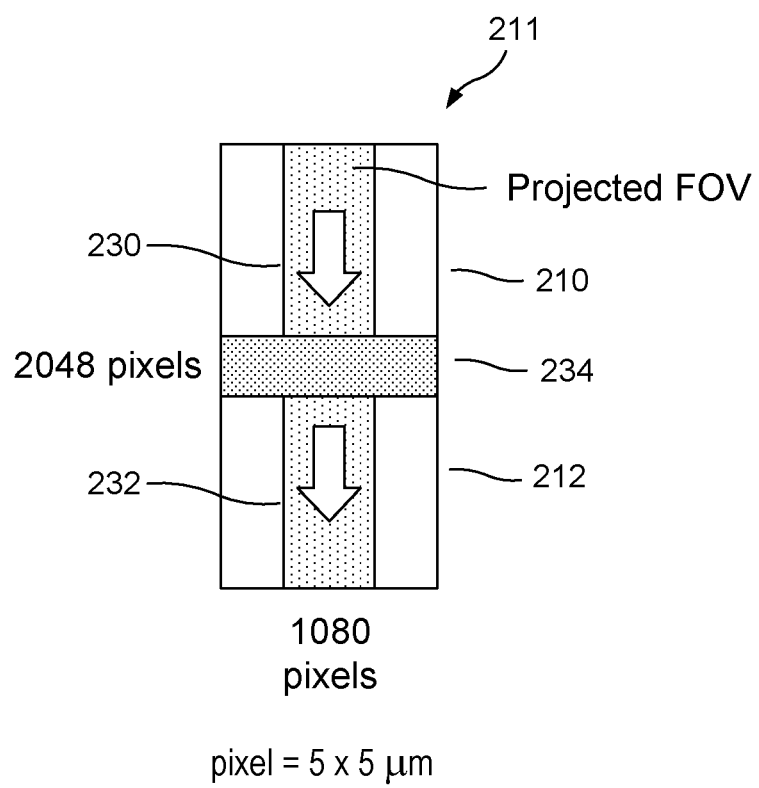
FIG. 12 is a schematic of the composite image of the field splitter of the present disclosure, showing two different views of the materials sample.

FIG. 12 includes a further description of the composite image 211. In FIG. 12, first and second images 210, 212 are oriented in the same direction, whereas they are oriented in opposite directions in FIG. 7. Either configuration may be implemented. In FIG. 12, the field of view of first and second images 210, 212 are projected side by side onto image sensor 100, which may be implemented as a CMOS image sensor with 2048 by 1080 pixels, each pixel being 5 microns by 5 microns in size. The image is typically split along the 2048 pixel axis (vertical axis of FIG. 12) which is parallel to the 200 mm length axis of the field of view (see FIG. 10). The sensor 100 includes first and second 462 by 924 pixel regions 230, 232 (with a buffer zone 234 separating the two pixel regions by 200 pixels). The resulting configuration has a pixel resolution of approximately 216 microns per pixel and an optical magnification of approximately $\frac{1}{43}$.

The two fields of view overlap a common x-y area on the object plane and, as described above, is from a different angular perspective with respect to materials sample 200. This different angular perspective may be separated by 20 degrees, as illustrated in FIG. 10. A common field of view in object space may be 200 mm vertical (Y) and 100 mm horizontal (X). The projected 200×100 mm object field of views onto the pixel space may exclude transition regions and be free of cross-talk effects. The object (e.g., image of materials sample 200) may move in the Z-axis by plus or minus 50 mm, thereby requiring a 100 mm depth of field. The total optical system (not shown) may typically image at a single wavelength such as 630 nanometers (LED). In a typical configuration of the optical system, the minimum light-gathering ability would be equivalent to an F-stop number of 5.6. Furthermore, the optical system typically must be polarization preserving, with a minimum clear working distance from the end of the optical system to the object plane of approximately 300 mm. The prism/mirror assembly associated with the image sensor 100 (see FIG. 7) should be designed to minimize sensitivity and vibration. It is further envisioned that the weight of the resulting optical system is optimally less than 2.0 kilograms.

The typical benefits of the embodiment in FIGS. 6-12 over the embodiment of FIG. 5 include:

1. the embodiment of FIGS. 6-12 typically can be implemented as an extension to a wide range of existing cameras.

2. the embodiment of FIGS. 6-12 typically does not require that two separate cameras be synchronized with each other.

3. the embodiment of FIGS. 6-12 typically involves less mass than the embodiment of FIG. 5, thereby improving stability against vibration.

4. the embodiment of FIGS. 6-12 typically is less expensive than embodiments with two cameras and imaging lens.

5. the embodiment of FIGS. 6-12 is typically easier to calibrate three-dimensionally because only one imaging lens and one camera needs to be calibrated.

It is further noted that the asymmetric arm length illustrated in FIG. 7 typically allows full backward compatibility with existing hardware and software as the perspective of one image does not change.

Thus the several aforementioned objects and advantages are most effectively attained. Although preferred embodiments of the invention have been disclosed and described in detail herein, it should be understood that this invention is in no sense limited thereby.

What is claimed is:

1. A device for strain measurement and calculation, including:
    a field splitter, including first and second objectives, for receiving first and second images of a materials testing sample through the respective first and second objectives, from first and second angles and combining the first and second images into a single composite image;
    a first device for receiving the single composite image and generating a single digital image; and
    a second device for receiving the single digital image and performing strain calculations with respect to the material testing sample by measuring a selected gauge length and subsequently performing a three-dimensional calculation to calculate at least one change in the selected gauge length in order to calculate strain.

2. The device for strain measurement and calculation of claim 1 wherein wherein the at least one change in the selected gauge length is a time-dependent change in the selected gauge length in order to calculate a time-dependent strain.

3. The device for strain measurement and calculation of claim 1 wherein the second device for receiving the single digital image and performing strain calculations with respect to a material testing sample defines the gauge length as being a distance between first and second video targets on a materials testing sample, a distance between first and second video targets increasing under tensile load.

4. The device for strain measurement and calculation of claim 3 wherein the field splitter includes a housing, the housing including first and second optical pathways for receiving the respective first and second images, the housing further including a third optical pathway with an associated mount for an optical lens, the single composite image being transmitted through the third optical pathway.

5. The device for strain measurement and calculation of claim 4 wherein the first device for receiving the single composite image and generating a single digital image includes a lens that is mounted on the associated mount for an optical lens.

6. The device for strain measurement and calculation of claim 4 wherein the first device for receiving the single composite image and generating a single digital image is a digital camera.

7. A method of strain measurement and calculation, including the steps of:
    providing a field splitter, including first and second objectives, for receiving first and second images of a materials testing sample from first and second angles through the respective first and second objectives;
    combining the first and second images into a single composite image;
    receiving the single composite image and generating a single digital image; and
    receiving the single digital image; and
    performing strain calculations on the single digital image with respect to the material testing sample, further including the step of measuring a selected gauge length and subsequently performing a three-dimensional calculation to calculate at least one change in the selected gauge length in order to calculate strain.

8. The method of strain measurement and calculation of claim 7 wherein the at least one change in the selected gauge length is a time-dependent change in the selected gauge length in order to calculate a time-dependent strain.

9. The method of strain measurement and calculation of claim 7 wherein the step of performing strain calculations with respect to a material testing sample further includes the step of defining the gauge length as being a distance between first and second video targets on a materials testing sample, a distance between first and second video targets increasing under tensile load.

10. The method of strain measurement and calculation of claim 9 further including the step of providing a housing for the field splitter, the housing including first and second optical pathways for receiving the respective first and second images, the housing further including a third optical pathway with an associated mount for an optical lens, the single composite image being transmitted through the third optical pathway.

11. The method of strain measurement and calculation of claim 10 wherein the step of receiving the single composite image includes the step of providing a lens that is mounted on the associated mount for an optical lens.

12. The method of strain measurement and calculation of claim 10 wherein the steps of receiving the single composite image and generating a single digital image are performed by a digital camera.

* * * * *